May 2, 1961 R. E. GOESCH Re. 24,976

IRRIGATION PIPE CARRIER

Original Filed Sept. 9, 1954 4 Sheets-Sheet 1

Reuben E. Goesch
INVENTOR.

BY Clarence A. O'Brien and Harvey B. Jacobson
Attorneys

IRRIGATION PIPE CARRIER

Original Filed Sept. 9, 1954 4 Sheets-Sheet 2

Reuben E. Goesch
INVENTOR.
BY Clarence A. O'Brien and Harvey B. Jacobson
Attorneys IRRIGATION PIPE CARRIER
Original Filed Sept. 9, 1954 4 Sheets-Sheet 3
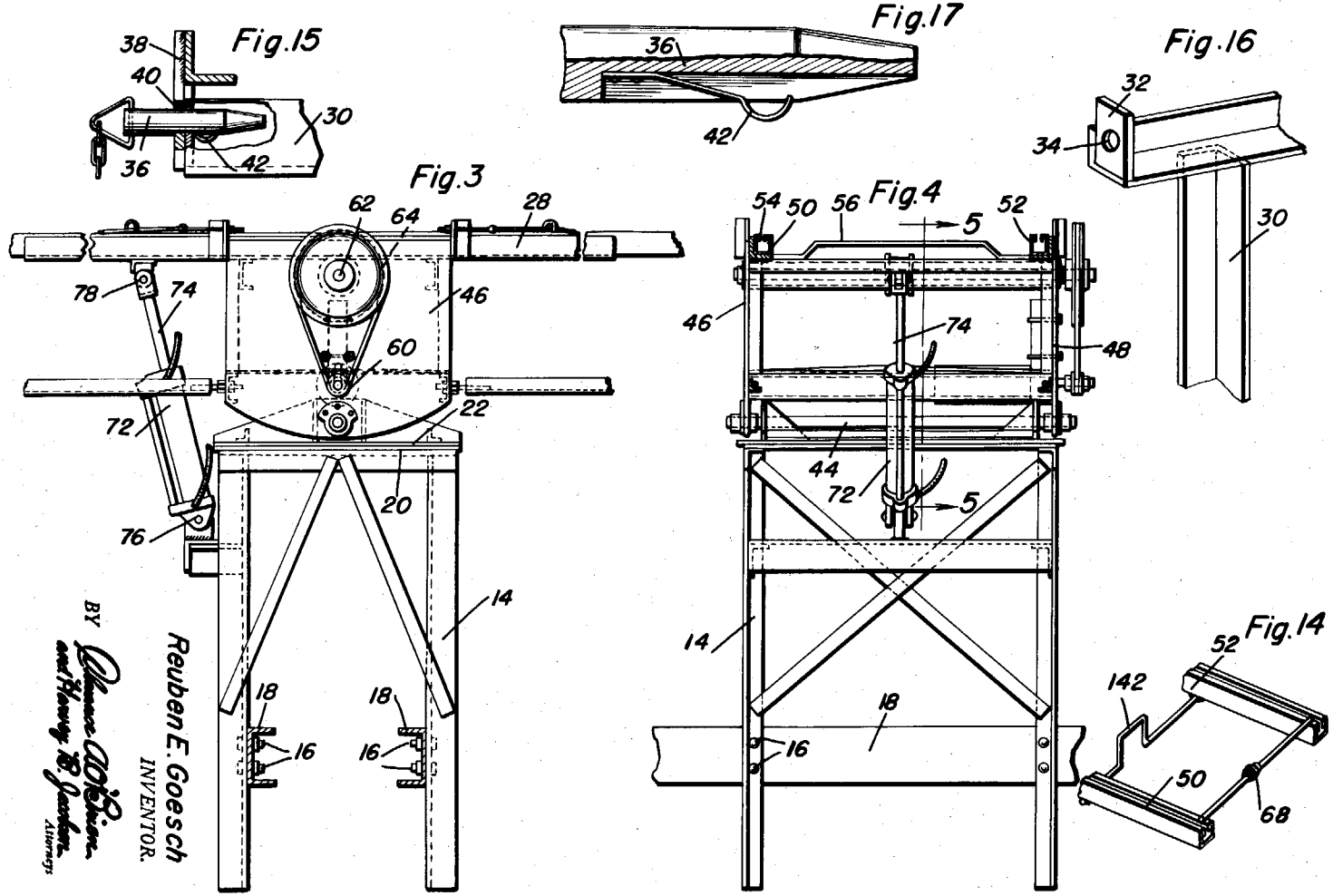

May 2, 1961 R. E. GOESCH Re. 24,976
IRRIGATION PIPE CARRIER
Original Filed Sept. 9, 1954 4 Sheets-Sheet 4
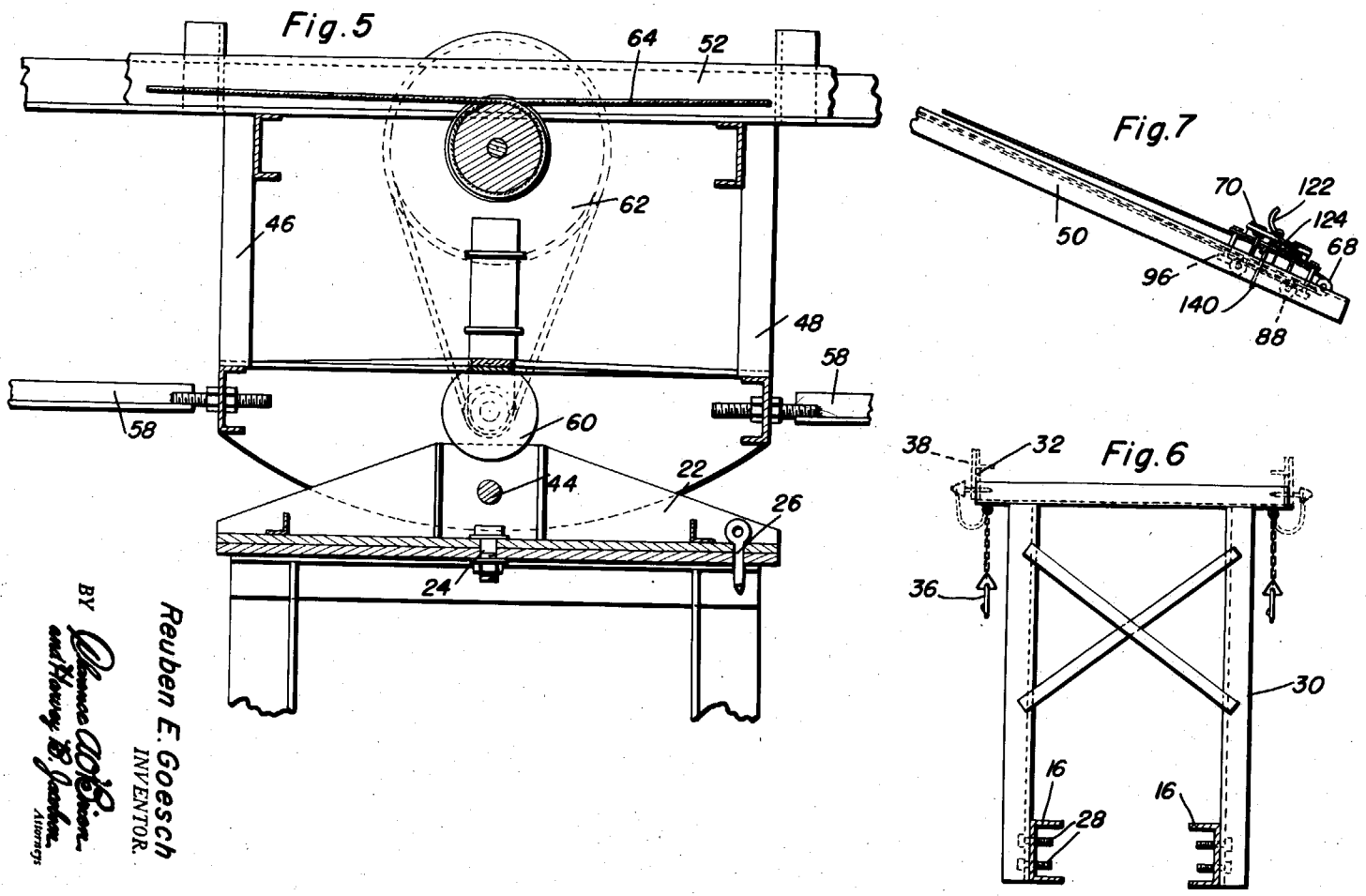
Reuben E. Goesch
INVENTOR.
BY Clarence A. O'Brien and Harvey B. Jacobson
Attorneys United States Patent Office Re. 24,97(
Reissued May 2, 196!

24,976

IRRIGATION PIPE CARRIER

Reuben E. Goesch, Sutton, Nebr., assignor to L. R. Nelson Mfg. Co., Inc.

Original No. 2,818,182, dated Dec. 31, 1957, Ser. No. 455,021, Sept. 9, 1954. Application for reissue Dec. 16, 1959, Ser. No. 860,053

10 Claims. (Cl. 214—1)

Matter enclosed in heavy brackets [ ] appears in the original patent but forms no part of this reissue specification; matter printed in italics indicates the additions made by reissue.

This invention relates generally to agricultural equipment and more particularly to an attachment for a tractor for use as an irrigation pipe carrier.

The primary object of the present invention resides in the provision of means for mechanically moving irrigation pipe sections from one location to another without requiring manual labor.

The common irrigation sprinkler system consists of a main pipe line and one or more laterals of pipe usually arranged in 30 ft. lengths with a sprinkler head at every other pipe junction and quick make and break coupling devices. Each sprinkler head covers a circular area of approximately 60 ft. diameter and in order to sprinkle a field the pipe is moved laterally by bounds 60 ft. at a bound.

Conventionally, irrigation pipe is moved a length at a time by at least two men walking through mud and over furrows holding the pipe over their heads in cornfields so as not to snap off the cornstalks. This hard and tedious labor is a very expensive and time consuming project and as a consequence the persent invention resides in the provision of means for satisfactorily and economically doing this using mechanical means.

A further object of the invention resides in the provision of a simple attachment for use with any conventional tractor that will move two lengths of pipe at one time laterally 60 ft. without reversing the pipe ends thereby facilitating the rapid reassembly of the pipe line.

Still further objects of the invention reside in the provision of a novel irrigation pipe mover having a traveling pipe carrier which is adapted to carry pipe clamps which may be reversibly and detachably secured thereon so that the entire boom may be utilized back and forth across a field without requiring the rotation thereof.

Still another object of the invention resides in the provision of an irrigation pipe carrier which includes means for automatically releasing the pipe after it has been transported the desired distance.

The construction of this invention features a boom which is rotatably detachably mounted on a vehicle such as a conventional farm tractor or other types of suitable vehicles. Means for tilting the boom are provided which includes a hydraulically actuated mechanism and there is provided a pipe carrier on the boom which has pipe clamps detachably reversably secured thereto. A drum driven by an electric motor is provided and cables are connected to the drum and to the pipe carrier for moving the pipe carrier along the boom.

Still further objects and features of this invention reside in the provision of an irrigation pipe mover that is simple in construction and operation, relatively inexpensive to manufacture and highly efficient in operation.

These, together with the various ancillary objects and features of the invention which will become apparent as the following description proceeds, are attained by this irrigation pipe carrier, a preferred embodiment of which has been illustrated in the accompanying drawings, b way of example only, wherein:

Figure 3 is an enlarged partial elevational view of th irrigation pipe carrier showing the mounting arrangeme thereof;

Figure 4 is a sectional view as taken along the plar of line 4—4 in Figure 2 and showing on an enlarge scale the construction of the mounting means;

Figure 5 is a partial sectional detail view as take along the plane of line 5—5 in Figure 4 and being show in an enlarged scale;

Figure 6 is a front elevational view of the front brack or support used to hold the boom longitudinally wi respect to the tractor when the tractor is moving fro one location to another;

Figure 7 is *a* partial elevational view illustrating particular the trip mechanism for the pipe clamps;

Figure 10 is a plan view of the pipe clamps with par thereof being shown in section for greater detail;

Figure 11 is an elevational view of the pipe clam with parts thereof being shown in section for detail;

Figure 12 is a sectional view as taken along the pla of line 12—12 of Figure 10 and illustrating on an e larged scale the construction of the pipe clamps in closed position;

Figure 13 is a view similar to that of Figure 12 a illustrating the pipe clamps in an open position;

Figure 14 is a perspective view of the trip relea mechanism;

Figure 15 is a sectional view of the locking mech nism for holding the boom longitudinally with respect the tractor;

Figure 16 is an enlarged partial perspective view the bracket which is adapted to be mounted on the fra of the tractor for lockingly supporting the boom; a Figure 17 is an enlarged sectional view showing detail the construction of the pin utilized to lock the boo in longitudinal position with respect to the tractor.

Figure 1:
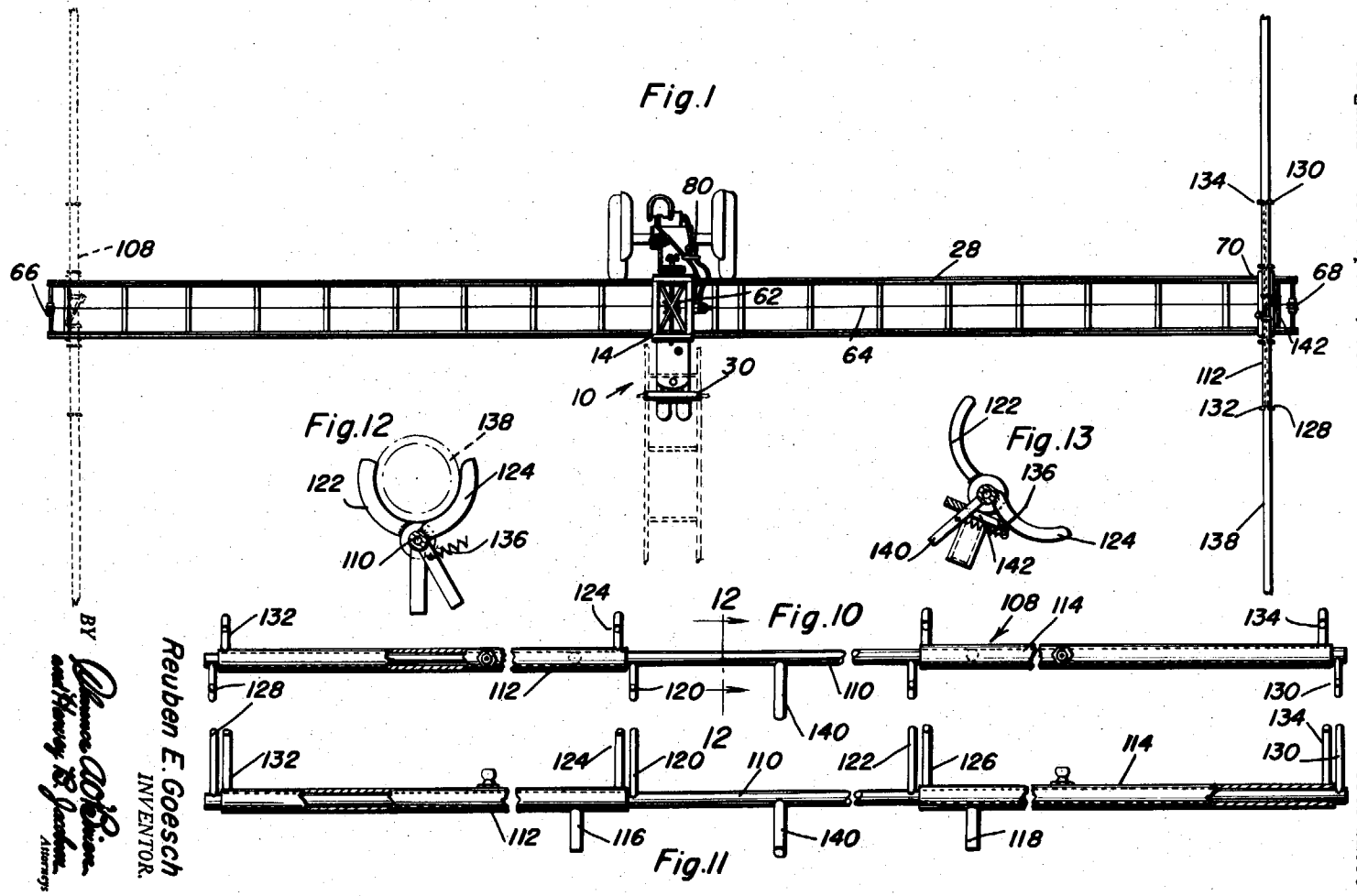
Figure 1 is a top plan view of the irrigation pipe carrie

With continuing reference to the accompanying dra ings wherein like reference numerals designate simil parts throughout the various views, and with particul attention initially to Figures 1 through 4 it will be se that herein there is provided the irrigation pipe mov which comprises the present invention and which is ge erally designated by reference numeral 10 and which adapted to be mounted on a conventional tractor 12. T irrigation pipe mover 10 includes a frame 14 of any su able configuration which is adapted to be bolted as at to the frame 18 of the tractor 12. The frame 14 m be formed of siutable angle iron members and includ a top plate 20 on which a platform 22 is rotatab mounted by any suitable means, such as the pin or b 24 as can be seen in Figure 5. A pin may be provid as at 26 for locking the platform 22 in a position whe the boom 28 will extend transversely relative to the tr tor 12. Mounted on the frame 18 of the tractor 12 means of bolts 28 or by any other suitable means is bracket 30 which can be seen best in Figure 16 includ a plate 32 provided with an aperture 34 therethrough f the reception of a pin 36 which is used to hold the boo 28 locked in a longitudinal position relative to the tract 12. The boom 28 includes a plate 38 which depen therefrom and which has an aperture 40 therein, s Figures 2 and 15, the aperture 40 being adapted to ali with the aperture 34 so that the pin 36 can extend the through. The pin 36 has a spring pressed detent 42 f lockingly engaging the plate 32.

Pivotally mounted on the platform 22 by means of a aft 44 are the center plates 46 and 48 of the boom 28. The boom 28 consists mainly of a pair of spaced ıcks 50 and 52 which are substantially channel-shaped d provided with upper substantially L-shaped flanges at 54. Interconnecting and reinforcing the tracks 50 d 52 are transverse braces 56 which are spaced sub- ıntially equidistant along the length of the boom 28. lower strength member 58 may be provided as neces- :y since the boom 28 is generally cantilever in con- uction. The center plates 46 and 48 are attached by y suitable means such as welding or the like to the ınsverse braces 48 and to the tracks 50 and 52 as may desired and an electric motor 60 or other suitable me mover is mounted in any convenient manner there- tween for driving a drum 62 mounted between the ıtes 46 and 48.

Figure 2:
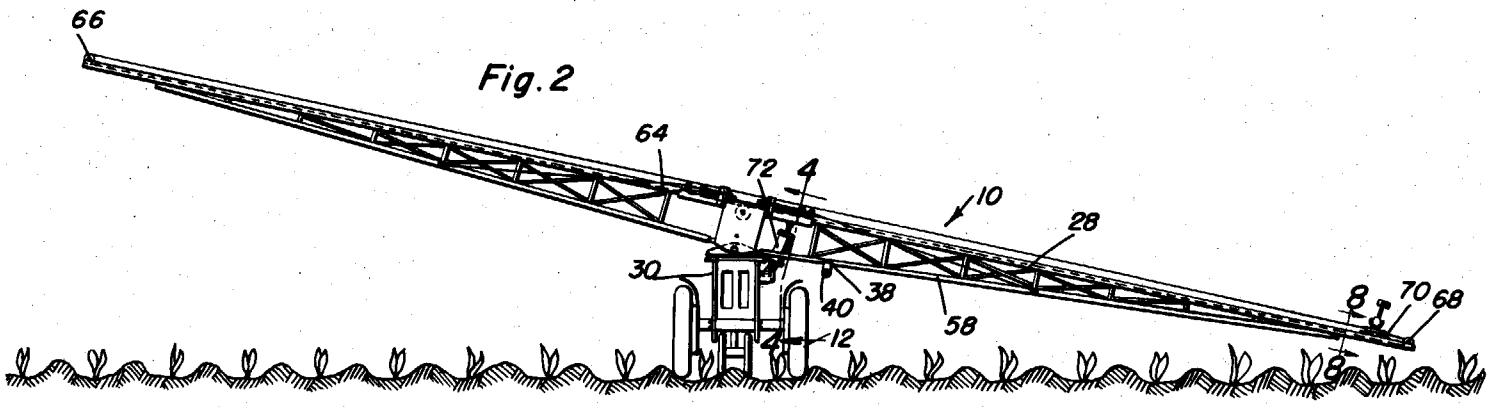
Figure 2 is a front elevational view of this inventio

Entrained upon the drum 62 is a cable 64 which is ıo entrained about pulleys 66 and 68 mounted on the ds of the boom 28, see Figures 1 and 2, with the ends the cable being attached to a pipe carrier 70. Hence, on operation of the electric motor 60 by any suitable ntrol means such as a push button control or the like, : carrier 70 may be moved from one end of the boom the other end thereof as may be desired. Positive ps may be provided if considered necessary for limit- ; the movement of the pipe carrier 70.

There is provided means for tilting the boom 28 which :ludes a hydraulic cylinder 72 actuating a piston rod , the cylinder being pivotally detachably secured as by :ans of a pin 76 to the frame 14 with the piston rod 74 ing pivotally attached as at 78 to the boom 28. The linder 72 may be connected to the hydraulic system the tractor and operated by the conventional hy- aulic controls 80 of the tractor 12.

Figure 8:
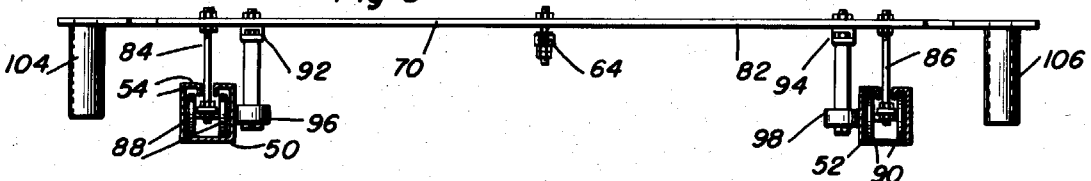
Figure 8 is an enlarged sectional view as taken alo the plane of line 8—8 in Figure 2.
Figure 9:
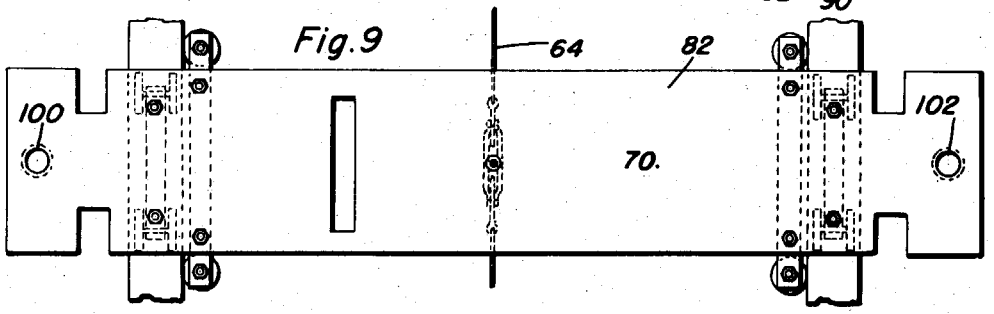
Figure 9 is a plan view of the pipe carrier.

The pipe carrier 70 whose construction can be best :n in Figures 8 and 9 consists of a bed or plate 82 ›m which depends rods 84 and 86 on which wheels 88 d 90 are rotatably mounted, the wheels 88 and 90 seat- ; within the tracks 50 and 52. The wheels are retained ainst accidental dislocation by means of the flanges 54. so depending from brackets 92 and 94 attached to the ıte or bed 82 are pairs of rollers 96 and 98 which en- ge the inner surfaces of the tracks 50 and 52 to guid- ;ly restrain the movement of the pipe carrier 70. The ds of the cable 64 are of course attached to the pipe rrier and movement of the cable 64 will of course ıse movement of the pipe carrier 70. The pipe carrier has a pair of apertures 100 and 102 therethrough and :kets 104 and 106 are attached to the pipe carrier 70 alignment with the apertures 100 and 102.

Referring now to Figures 10 through 13 it will be :n that herein there is shown the pipe clamps which : adapted to be mounted in the sockets 104 and 106 · detachable and reversible operation. The pipe clamps ıerally designated by reference numeral 108 include :entral member 110 which has tubular end members 2 and 114 slidably received thereon. Depending from : tubular members 112 and 114 are rods 116 and 118 apted to seat in the sockets 104 and 106. This holds : pipe clamps 108 in position and it can be readily :n that upon removal and reversal of the rods 116 and 8 to the opposite socket of the sockets 104 and 106, : pipe clamps 108 are effectively reversed. Carried the central member 110 are an inner pair of clamp ments 120 and 122 which cooperate with the pair of mp elements 124 and 126 attached to the tubular :mbers 112 and 114. Outer clamp elements 128 and 0 are also attached to the ends of the central member 0 as are outer clamp elements 132 and 134 which are ached to the tubular outer members 112 and 114. :e clamp members are normally spring pressed as at 6 or by any other convenient means to a closed posi- n so as to securely grasp a section of irrigation pipe ıerally designated by reference numeral 138. However, when the trip arm 140 depending from the central member 110 engages the trip release rod 142 which is mounted on and extends between the tracks 50 and 52, the pipe clamps 108 will be opened. It is to be recognized that there is provided a trip release adjacent either end of the boom 28 with the trip release being also adapted to serve as a positive stop for the carrier 70. Hence, after movement of the carrier from one end of the boom 28 to the other end thereof, the pipe will be automatically released and allowed to fall immediately adjacent the location where it is next to be utilized. Of course, the pipe is positioned in the pipe clamps by hand.

The invention is utilized in this manner. The tractor, with the irrigation pipe mover comprising the present invention mounted thereon is driven along a lateral pipe line, 30 ft. to one side or the other, depending upon the direction in which the pipe is to be moved. The boom 28 is lowered so one end is adjacent the ground at the pipe joint with a sprinkler head. The joints to either side thereof are disconnected and the two lengths of pipe, still connected, are placed in the pipe clamps 108 of the pipe carrier 70. The pipe carrier 70 is then moved to the other end of the boom, while the boom is being tilted utilizing the hydraulic cylinder so that the opposite end of the boom now rests on the ground. When the carrier reaches the other end of the boom, the pipe clamps are tripped by the trip release mechanism and the pipe gently rolled out onto the ground.

The pipe lengths which have just been moved are then coupled to a readily laid pipe at the same time that the tractor is driven ahead to the next joint containing a sprinkler head where the process is repeated.

When the tractor reaches the end of the pipe line, the pipe clamps are reversed in the sockets on the pipe carrier and the boom is set on blocks so that the whole pipe mover may be disconnected from the tractor 12 so that the tractor may be driven away to do any other work that the farmer may desire.

When the pipe line is again ready to be moved, the tractor is driven to the boom and the pipe mover mounted. The machine moves along the pipe line in the opposite direction while the pipe is moved laterally another sixty feet. This reversing feature of the pipe clamps allows the pipe mover to work in either direction so that the pipe mover does not have to be unnecessarily transported across the field or turned around at the end of the field.

Since from the foregoing the construction and advantages of this irrigation pipe mover are readily apparent, further description is believed to be unnecessary.

However, since numerous modifications will be readily apparent to those skilled in the art, after a consideration of the foregoing specifications and accompanying drawings, it is not intended to limit the invention to the precise embodiment shown and described, and all suitable modifications and equivalents may be readily resorted to which fall within the scope of the appended claims.

What is claimed as new is as follows:

1. An irrigation pipe mover comprising a wheeled vehicle, a boom, means rotatably detachably mounting said boom on said vehicle, means for tilting said boom connected thereto, a pipe carrier on said boom, and means for moving said pipe carrier from end to end of the boom, pipe clamps on said pipe carrier, said pipe clamps being normally closed, and trip release means on said boom for opening said pipe clamps when said pipe carrier has reached an end of said boom.

2. An irrigation pipe mover comprising a wheeled vehicle, a boom, means rotatably detachably mounting said boom on said vehicle, means for tilting said boom connected thereto, a pipe carrier on said boom, and means for moving said pipe carrier from end to end of the boom, said boom including a pair of spaced tracks, said pipe carrier riding in said tracks, pipe clamps on said pipe carrier, said pipe clamps being normally closed, and trip release means on said boom for opening said pipe clamps when said pipe carrier has reached an end of said boom.

3. An irrigation pipe mover comprising a wheeled vehicle, a boom, means rotatably detachably mounting said boom on said vehicle, means for tilting said boom connected thereto, a pipe carrier on said boom, and means for moving said pipe carrier from end to end of the boom, said boom including a pair of spaced tracks, said pipe carrier riding in said tracks, pipe clamps on said pipe carrier, said pipe clamps being normally closed, and trip release means on said boom for opening said pipe clamps when said pipe carrier has reached an end of said boom, said trip release means extending between said tracks.

4. An irrigation pipe mover comprising a wheeled vehicle, a boom, means rotatably detachably mounting said boom on said vehicle, means for tilting said boom connected thereto, a pipe carrier on said boom, and means for moving said pipe carrier from end to end of the boom, pipe clamps on said pipe carrier, said pipe clamps being normally closed, and trip release means on said boom for opening said pipe clamps when said pipe carrier has reached an end of said boom, said pipe clamps being detachably reversibly secured to said pipe carrier and extending transversely relative to said boom beyond said boom and said pipe carrier.

5. An irrigation pipe mover comprising a wheeled vehicle, a boom, means rotatably detachably mounting said boom on said vehicle, means for tilting said boom connected thereto, a pipe carrier on said boom, and means for moving said pipe carrier from end to end of the boom, said boom including a pair of spaced tracks, said pipe carrier riding in said tracks, pipe clamps on said pipe carrier, said pipe clamps being normally closed, and trip release means on said boom for opening said pipe clamps when said pipe carrier has reached an end of said boom, said trip release means extending between said tracks, said pipe clamps being detachably reversibly secured to said pipe carrier and extending transversely relative to said boom beyond said boom and said pipe carrier.

6. An irrigation pipe mover comprising a wheeled vehicle, a boom, means rotatably detachably mounting said boom on said vehicle, means for tilting said boom connected thereto, a pipe carrier on said boom, and means for moving said pipe carrier from end to end of the boom pipe clamps on said pipe carrier, said pipe clamps being normally closed, and trip release means on said boom for opening said pipe clamps when said pipe carrier has reached an end of said boom, said pipe carrier including wheels riding in said tracks, and rollers depending from said pipe carrier guidingly engaging the inner surfaces of said tracks.

7. An irrigation pipe mover comprising a wheeled vehicle, a boom, means rotatably detachably mounting said boom on said vehicle, means for tilting said boom connected thereto, a pipe carrier on said boom, and means for moving said pipe carrier from end to end of the boom, said boom including a pair of spaced tracks, said pipe carrier riding in said tracks, pipe clamps on said pipe carrier, said pipe clamps being normally closed, and trip release means on said boom for opening said pipe clamps when said pipe carrier has reached an end of said boom, said trip release means extending between said tracks, said pipe clamps being detachably reversibly secured to said pipe carrier and extending transversely relative to said boom beyond said boom and said pipe carrier, said pipe carrier including wheels riding in said tracks, and rollers depending from said pipe carrier guidingly engaging the inner surfaces of said tracks.

8. An irrigation pipe mover comprising a wheeled vehicle, a boom, means rotatably detachably mounting said boom on said vehicle, means for tilting said boom connected thereto, a pipe carrier on said boom, and means for moving said pipe carrier from end to end of the boom pipe clamps on said pipe carrier, said pipe clamps being normally closed, and trip release means on said boom for opening said pipe clamps when said pipe carrier has reached an end of said boom, said means for moving said pipe carrier including a drum, a cable entrained about said drum, pulleys on the ends of said boom, said cable being entrained about said pulleys, said cable being attached to said pipe carrier.

9. An irrigation pipe mover comprising a wheeled vehicle, a boom, means rotatably detachably mounting said boom on said vehicle, means for tilting said boom connected thereto, a pipe carrier on said boom, and means for moving said pipe carrier from end to end of the boom, said boom including a pair of spaced tracks, said pipe carrier riding in said tracks, pipe clamps on said pipe carrier, said pipe clamps being normally closed, and trip release means on said boom for opening said pipe clamps when said pipe carrier has reached an end of said boom, said trip release means extending between said tracks, said pipe clamps being detachably reversibly secured to said pipe carrier and extending transversely relative to said boom beyond said boom and said pipe carrier, said pipe carrier including wheels riding in said tracks, and rollers depending from said pipe carrier guidingly engaging the inner surfaces of said tracks, said means for moving said pipe carrier including a drum, a cable entrained about said drum, pulleys on the ends of said boom, said cable being entrained about said pulleys, said cable being attached to said pipe carrier.

*10. An irrigation pipe mover comprising a wheeled vehicle, a boom disposed on said vehicle in laterally extending operative relation with respect thereto, means mounting said boom on said vehicle for tilting and rotating movement with respect to said vehicle, a pipe carrier on said boom, means for moving said pipe carrier longitudinally along said boom between a pipe receiving position and a remotely spaced pipe discharging position, both of said positions being disposed in laterally spaced relation with respect to said vehicle, pipe clamps stably mounted on said pipe carrier for engaging a pipe when said carrier is disposed in said pipe-receiving position and for releasing a pipe when said carrier is disposed in said discharging position, said pipe clamps being normally closed in engagement with a pipe during the movement of said pipe carrier along said boom from said pipe receiving position to said pipe discharging position, and trip release means operatively connected with said pipe clamps for opening said pipe clamps in response to the movement of said pipe clamps into the releasing position thereof.*

References Cited in the file of this patent or the original patent

UNITED STATES PATENTS

| | | |
|---|---|---|
| 143,222 | Cokly | Sept. 30, 1873 |
| 505,749 | Cardarelli | Sept. 26, 1893 |
| 647,870 | Patterson | Apr. 17, 1900 |
| 857,856 | Baehr et al. | June 25, 1907 |
| 983,772 | Sain | Feb. 7, 1911 |
| 1,023,006 | Carriker | Apr. 9, 1912 |
| 1,522,408 | Bayard | Jan. 6, 1925 |
| 1,534,797 | McLeod | Apr. 21, 1925 |
| 1,626,410 | Halstead | Apr. 26, 1927 |
| 1,740,575 | Clausen et al. | Dec. 24, 1929 |
| 1,786,608 | Halstead | Dec. 30, 1930 |
| 1,933,225 | Smith | Oct. 31, 1933 |
| 2,520,196 | Boone | Aug. 29, 1950 |
| 2,584,466 | Kaserman | Feb. 5, 1952 |